US010809813B2

(12) United States Patent
Rieman et al.

(10) Patent No.: US 10,809,813 B2
(45) Date of Patent: Oct. 20, 2020

(54) METHOD, APPARATUS, SERVER, SYSTEM AND COMPUTER PROGRAM PRODUCT FOR USE WITH PREDICTIVE TEXT INPUT

(75) Inventors: John Rieman, Helsinki (FI); Minna Hekanaho, Oulu (FI); Minna Koutonen, Oulu (FI); Tero Rantonen, Oulu (FI); John Hard, Malmo (SE)

(73) Assignee: Nokia Technologies Oy, Espoo (FI)

( * ) Notice: Subject to any disclaimer, the term of this patent is extended or adjusted under 35 U.S.C. 154(b) by 1286 days.

(21) Appl. No.: 12/046,786

(22) Filed: Mar. 12, 2008

(65) Prior Publication Data

US 2008/0243834 A1    Oct. 2, 2008

Related U.S. Application Data

(60) Provisional application No. 60/908,822, filed on Mar. 29, 2007.

(51) Int. Cl.
*G06F 3/023* (2006.01)
*G06F 40/00* (2020.01)
*G06F 40/274* (2020.01)

(52) U.S. Cl.
CPC .......... *G06F 3/0237* (2013.01); *G06F 40/274* (2020.01)

(58) Field of Classification Search
CPC .............. G06F 3/0237; G06F 17/2735; G06F 17/30345; G06F 17/30575; G06F 17/2276
USPC .................. 715/210, 234, 259; 707/999.006
See application file for complete search history.

(56) References Cited

U.S. PATENT DOCUMENTS

| 5,911,485 | A | * | 6/1999 | Rossmann | G06F 3/0237 |
| | | | | | 341/20 |
| 5,953,503 | A | * | 9/1999 | Mitzenmacher | H04L 29/06 |
| | | | | | 709/203 |
| 6,223,059 | B1 | * | 4/2001 | Haestrup | G06F 3/0237 |
| | | | | | 345/172 |
| 6,345,245 | B1 | | 2/2002 | Sugiyama et al. | |
| 6,795,822 | B1 | | 9/2004 | Matsumoto et al. | |
| 6,964,020 | B1 | * | 11/2005 | Lundy | 715/210 |

(Continued)

FOREIGN PATENT DOCUMENTS

| EP | 0 788 062 A2 | 8/1997 |
| EP | 1 280 320 A1 | 1/2003 |

(Continued)

OTHER PUBLICATIONS

International Search Report, PCT/IB2007/001412, dated Dec. 13, 2007.

(Continued)

*Primary Examiner* — Ariel Mercado
(74) *Attorney, Agent, or Firm* — Alston & Bird LLP

(57) ABSTRACT

In a system, a server controller is configured to receive at least part of at least one personal dictionary, and is further configured to generate an adapted dictionary using words of the at least part of at least one personal dictionary. The server controller is also configured to transmit at least part of the adapted dictionary to the apparatus configured to use the adapted dictionary during predictive text entry. The apparatus includes an apparatus controller that is configured to receive at least part of an adapted dictionary from the server. The apparatus controller is also configured to utilize at least part of an adapted dictionary when predictive text entry is performed.

40 Claims, 9 Drawing Sheets

(56) References Cited

U.S. PATENT DOCUMENTS

| | | | |
|---|---|---|---|
| 7,912,700 B2 | 3/2011 | Bower et al. | |
| 2002/0143828 A1* | 10/2002 | Montero et al. | 707/533 |
| 2003/0023792 A1 | 1/2003 | Schneider | |
| 2003/0234821 A1* | 12/2003 | Pugliese | G06F 3/0237 715/816 |
| 2004/0039887 A1* | 2/2004 | Gautney | 711/159 |
| 2004/0148381 A1* | 7/2004 | Beppu | G06F 17/2735 709/223 |
| 2004/0153975 A1* | 8/2004 | Williams | G06F 3/0237 715/256 |
| 2005/0022114 A1* | 1/2005 | Shanahan et al. | 715/513 |
| 2005/0171944 A1 | 8/2005 | Palmquist | |
| 2005/0188330 A1* | 8/2005 | Griffin | G06F 3/0237 715/816 |
| 2005/0289141 A1* | 12/2005 | Baluja | 707/6 |
| 2006/0156233 A1 | 7/2006 | Nurmi | |
| 2006/0230350 A1* | 10/2006 | Baluja | G06F 40/274 715/700 |
| 2007/0233463 A1* | 10/2007 | Sparre | G06F 40/274 704/10 |

FOREIGN PATENT DOCUMENTS

| | | |
|---|---|---|
| TW | 459191 B | 10/2001 |
| TW | 478270 B | 3/2002 |
| TW | 200409053 A | 6/2004 |
| TW | 200506654 A | 2/2005 |
| WO | WO 2004/102422 A1 | 11/2004 |
| WO | 2007/005945 A2 | 1/2007 |

OTHER PUBLICATIONS

International Preliminary Report on Patentability and Written Opinion from corresponding International Patent Application No. PCT/IB2007/001412, dated Sep. 29, 2009.

Search Report from Taiwanese Patent Application No. 096118946 dated May 2, 2013.

\* cited by examiner

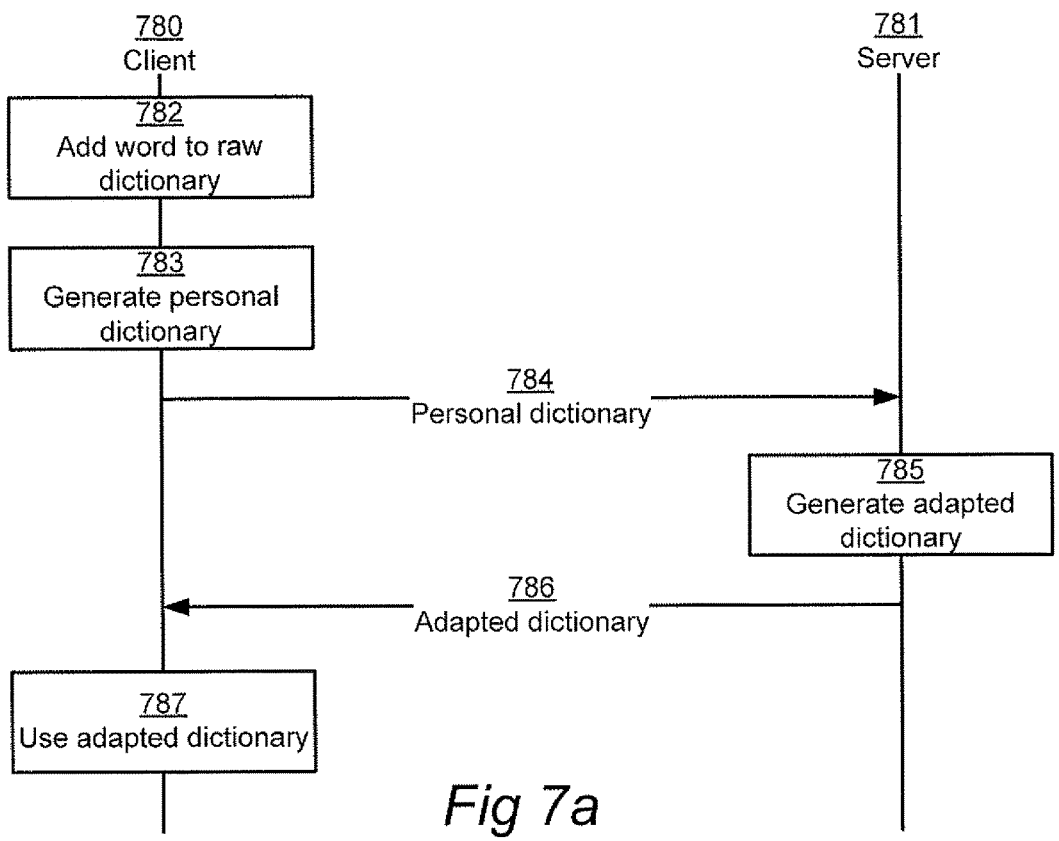
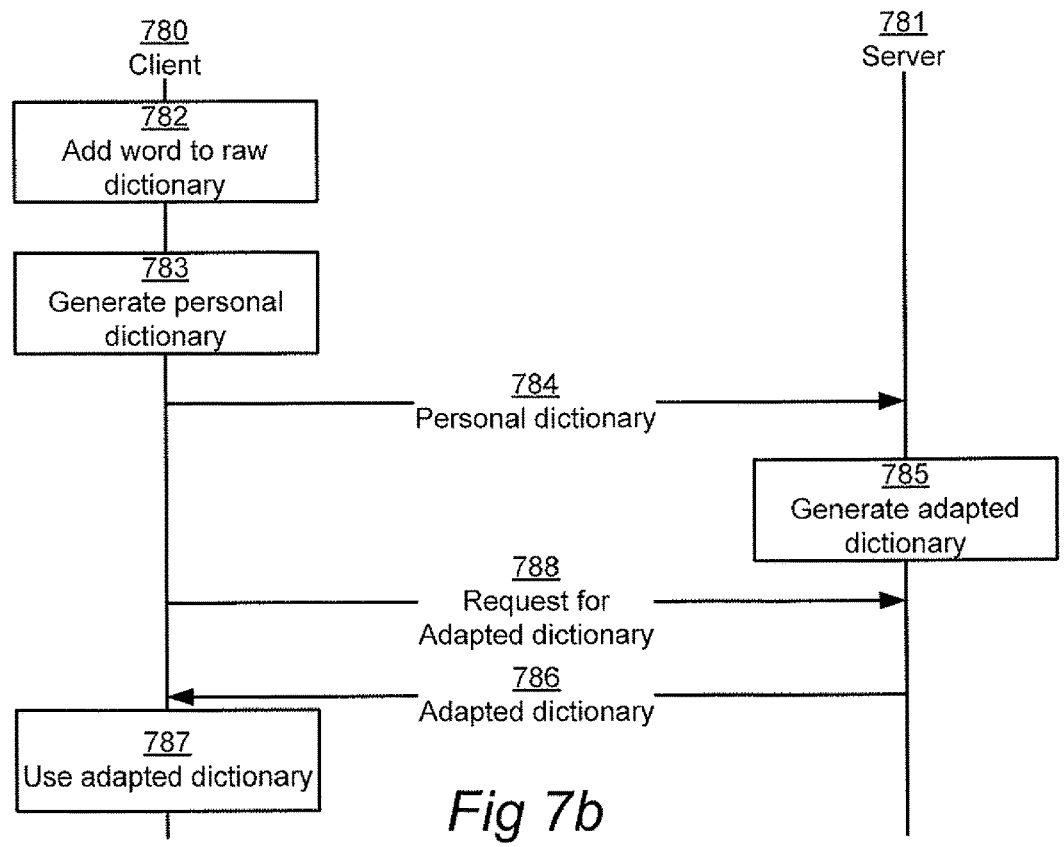

METHOD, APPARATUS, SERVER, SYSTEM AND COMPUTER PROGRAM PRODUCT FOR USE WITH PREDICTIVE TEXT INPUT

CROSS-REFERENCE TO RELATED APPLICATIONS

This application claims priority to, and the benefit of, U.S. Provisional Patent Application No. 60/908,822, filed on 29 Mar. 2007, the disclosure of which is incorporated herein by reference in its entirety.

FIELD

The disclosed embodiments generally relate to portable apparatuses and more particularly to text input in portable apparatus.

BACKGROUND

Mobile terminals, or mobile (cellular) telephones, for mobile telecommunications systems like GSM, UMTS, D-AMPS and CDMA2000 have been used for many years now. In the older days, mobile terminals were used almost exclusively for voice communication with other mobile terminals or stationary telephones. Gradually, the use of modern terminals has been broadened to include not just voice communication, but also various other services and applications such as www/wap browsing, video telephony, electronic messaging (e.g. SMS, MMS, email, instant messaging), digital image or video recording, FM radio, music playback, electronic games, calendar/organizer/time planner, word processing, etc.

Because of the form factor requirements of mobile devices, there is typically only a limited number of keys on keypads of mobile devices, especially compared to personal computer keyboards. Because of this, there has evolved a number of ways to input text with a limited keypad. One way to input text using a numerical keypad is to use predictive text entry. Each key of keypad is then associated with a number of letters. When a combination of numerical keys are pressed, a dictionary in the mobile device is used to look up what words could be represented by the performed key presses.

However, there is a problem that the dictionary is not completely comprehensive, i.e. it does not contain all potential words the user may want to type. In particular, proper nouns are typically poorly represented, as well as slang expressions.

In the prior art, this problem is alleviated by allowing the user to add custom words to a dictionary. However, with the typical dictionary supplied with the mobile terminal, the user still has to perform quite a significant amount of work to add the most commonly used words.

Consequently, there is a need to provide an improved way to manage dictionaries for mobile terminals.

SUMMARY

In view of the above, it would be advantageous to solve or at least reduce the problems discussed above.

According to a first aspect of the disclosed embodiments there has been provided a method comprising: receiving at least part of at least one personal dictionary; generating an adapted dictionary using words of said at least part of at least one personal dictionary; and transmitting at least part of said adapted dictionary to an apparatus configured to use said adapted dictionary during predictive text entry. In other words, the server can thus combine one or more personal dictionaries from different sources into one combined adapted dictionary, which is made available to one or more apparatuses for predictive text entry, reducing the need for a user/users of the one or more apparatuses to manually enter words into a dictionary of the one or more apparatus. The personal dictionary is a dictionary related to one user or one apparatus.

In said generating, said at least one personal dictionary may comprise a plurality of personal dictionaries.

The receiving may comprise receiving at least part of a plurality of personal dictionaries, each of said plurality of personal dictionaries being associated with a user being associated with one group of users; and said generating an adapted dictionary may comprise generating an adapted dictionary using words of said at least part of said plurality of personal dictionaries.

In said generating, statistical analysis may be used to determine what words of said words of said at least part of at least one personal dictionary, are to be included in said adapted dictionary.

The generating an adapted dictionary may involve: calculating a weight for each of said words of at least part of at least one personal dictionary; and generating an adapted dictionary by including only words of said words of at least part of at least one personal dictionary, with a weight greater than a threshold weight.

The calculating a weight for each of said words may include calculating a weight using a time stamp associated with each word as a parameter.

The method may further comprise: determining a category for said adapted dictionary. This category may be used to indicate to potential users the nature of the adapted dictionary, allowing the user to select a dictionary related to his/her interest.

The determining a category for said adapted dictionary may involve determining a category related to an aspect selected from the group consisting of: a dialect, a sociolect, a topic, a scientific field, a field of art, sport, and a specific field of interest.

The method may further comprise, prior to said transmitting: adding at least one word to said adapted dictionary, said at least one word being related to marketing of a product or a service.

The receiving may involve accepting only personal dictionaries associated with users being authorized to contribute to said adapted dictionary.

The transmitting may involve transmitting at least part of said adapted dictionary only to apparatuses corresponding to authorized recipients of said adapted dictionary.

The transmitting may involve: transmitting at least part of said adapted dictionary to apparatuses with users associated with said adapted dictionary.

The transmitting may occur as a consequence of changes occurring in said adapted dictionary.

The transmitting may occur with regular intervals.

A second aspect of the disclosed embodiments is a method comprising: receiving at least part of an adapted dictionary from a server, utilizing said at least part of an adapted dictionary when predictive text entry is performed. Such a method allow apparatuses to download adapted dictionaries from a server for use in predictive text entry, reducing the number of times a user of the apparatus needs to enter a new word to a personal dictionary, when such a word is not initially in a dictionary of the apparatus.

The method may further comprise: transmitting at least part of at least one personal dictionary to said server. The user of the apparatus can thus contribute words to the server, which may be used in adapted dictionaries downloaded by other users.

The method may further comprise: adding at least one word to a raw dictionary; and prior to said transmitting, generating each of said at least one personal dictionary from a raw user dictionary. A raw dictionary can be a dictionary associated with each user or apparatus, that a user can add words to at will.

The adding at least one word may involve adding at least one word to said personal dictionary corresponding to a word obtained from a text source selected from the group consisting of a user-entered text, an electronic mail, a short message, a multimedia message, a sound name, a music playlist, an image name, a bookmark in a web browser, a calendar item, an address book entry and a file name.

The adding at least one word may be performed as a consequence of a source of said at least one word becomes available.

The source of said at least one word may be a source selected from the group consisting of a user-entered text, an electronic mail, a short message, a multimedia message, a sound name, a music playlist, an image name, a bookmark in a web browser, a calendar item, an address book entry and a file name.

The adding at least one word may be performed in association with a scan of content items.

The transmitting at least part of at least one personal dictionary to said server may be performed as a response to a user input.

The transmitting at least part of at least one personal dictionary to said server may be performed when a transmit condition is fulfilled.

The transmitting at least part of at least one personal dictionary to said server may involve transmitting information about available memory in said apparatus for dictionaries.

The generating may involve including only words of said raw dictionary with a weight greater than a threshold.

The transmitting may involve transmitting authentication data.

The method may further comprise, prior to said receiving: transmitting a request to receive at least part of said adapted dictionary.

The transmitting may involve transmitting authentication data.

The method may further comprise, prior to said transmitting a request: detecting a user input to receive at least part of an adapted dictionary.

The method may further comprise, prior to said transmitting a request: receiving text input; checking whether at least one word of said text input is absent from a raw dictionary; when it is determined that at least one word is absent from said raw dictionary, said at least one word is determined to be present in a matching adapted dictionary.

The method may further comprise:
comparing said at least one word being absent from said raw dictionary with an adapted dictionary, resulting in zero or more matches,
when there are at least a threshold number of matches, prompting a user of said apparatus whether to download said adapted dictionary.

The transmitting may occur prior to said receiving.

A third aspect of the disclosed embodiments is a server comprising: a controller, said controller being configured to receive at least part of at least one personal dictionary; said controller further being configured to generate an adapted dictionary using words of said at least part of at least one personal dictionary; and said controller further being configured to transmit at least part of said adapted dictionary to an apparatus configured to use said adapted dictionary during predictive text entry.

A fourth aspect of the disclosed embodiments is a server comprising: means for receiving at least part of at least one personal dictionary; means for generating an adapted dictionary using words of said at least part of at least one personal dictionary; and means for transmitting at least part of said adapted dictionary to an apparatus configured to use said adapted dictionary during predictive text entry.

A fifth aspect of the disclosed embodiments is an apparatus comprising: a controller, said controller being configured to receive at least part of an adapted dictionary from said server, said controller further being configured to utilize said at least part of an adapted dictionary when predictive text entry is performed.

The apparatus may be comprised in an apparatus selected from the group consisting of a mobile communication terminal, a portable mp3-player, a camera, a pocket computer, and a portable gaming device.

A sixth aspect of the disclosed embodiments is an apparatus comprising: means for receiving at least part of an adapted dictionary from a server, means for utilizing said at least part of an adapted dictionary when predictive text entry is performed.

A seventh aspect of the disclosed embodiments is a system comprising: a server comprising: a server controller, said server controller being configured to receive at least part of at least one personal dictionary; said server controller further being configured to generate an adapted dictionary using words of said at least part of at least one personal dictionary; and said server controller further being configured to transmit at least part of said adapted dictionary to an apparatus configured to use said adapted dictionary during predictive text entry, and said apparatus comprising: an apparatus controller, said apparatus controller being configured to receive at least part of an adapted dictionary from said server, said apparatus controller further being configured to utilize said at least part of an adapted dictionary when predictive text entry is performed.

An eighth aspect of the disclosed embodiments is a method comprising: while in a predictive text input mode in an application, accepting user input representing a word in a first language; using a translation dictionary, looking up a word in a second language being equivalent of said word in said first language; and presenting said word in said second language. Translation capabilities can thereby be provides to users in any situation where predictive text entry is used, and not only in a dedicated translation application which may be cumbersome and time consuming to start when needed.

The method may further comprise, prior to said looking up a word: receiving said translation dictionary from a server.

A ninth aspect of the disclosed embodiments is an apparatus comprising: a controller, said controller being configured to, while in a predictive text input mode in an application with a main purpose other than translating text, accept user input representing a word in a first language; said controller further being configured to, using a translation dictionary, look up a word in a second language being equivalent of said word in said first language; and said controller further being configured to present said word in said second language.

A tenth aspect of the disclosed embodiments is a computer program product comprising software instructions that, when executed in a server, performs the method according to the first aspect.

An eleventh aspect of the disclosed embodiments is a computer program product comprising software instructions that, when executed in a mobile communication terminal, performs the method according to the second aspect.

A twelfth aspect of the disclosed embodiments is a computer program product comprising software instructions that, when executed in a mobile communication terminal, performs the method according to the eighth aspect.

Whenever the term "word" is used herein, it is to be construed as relating to a single word, a phrase or parts of sentences.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments will now be described in more detail, reference being made to the enclosed drawings, in which:

FIGS. 7a-d are sequence diagrams illustrating usage scenarios in the disclosed embodiments.

DETAILED DESCRIPTION OF EMBODIMENTS

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
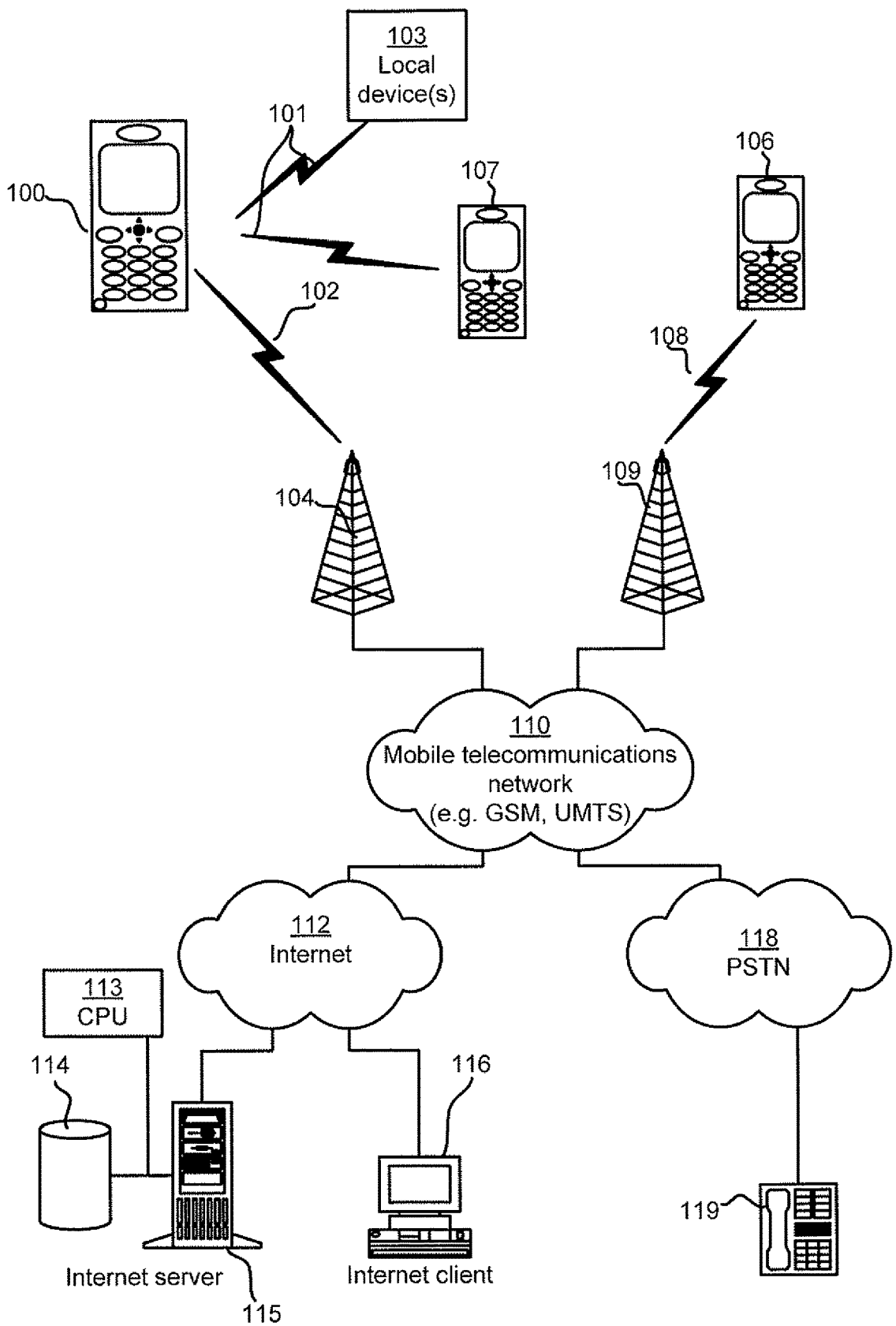
FIG. 1 is a schematic illustration of a cellular telecommunication system, as an example of an environment in which the disclosed embodiments may be applied.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the disclosed embodiments and other devices, such as another mobile terminal 106 or a stationary telephone 119. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 112, which may be Internet or a part thereof. A server 115 has a data storage 114 and is connected to the wide area network 112, as is an Internet client computer 116. The server 115 may transmit and receive dictionaries related to predictive text input to and from mobile terminals 100, 107. The server further comprises a controller 113, preferably implemented by any commercially available CPU ("Central Processing Unit"), DSP ("Digital Signal Processor") or any other electronic programmable logic device. The controller 113 is typically comprised within a housing of the server 115.

A public switched telephone network (PSTN) 118 is connected to the mobile telecommunications network 110 in a familiar manner. Various telephone terminals, including the stationary telephone 119, are connected to the PSTN 118.

The mobile terminal 100 is also capable of communicating locally via a local link 101 to another mobile terminal 107 or one or more local devices 103, such as a global positioning system (GPS) receiver. The local link 101 can be any type of link with a limited range, such as short-range radio frequency link (e.g. BLUETOOTH®), a Universal Serial Bus (USB) link, a Wireless Universal Serial Bus (WUSB) link, an IEEE 802.11 wireless local area network link, an RS-232 serial link, etc. The local link 101 can for example be used to directly transfer dictionary information used for predictive text entry between the mobile terminal 100 and the mobile terminal 107.

Figure 2:
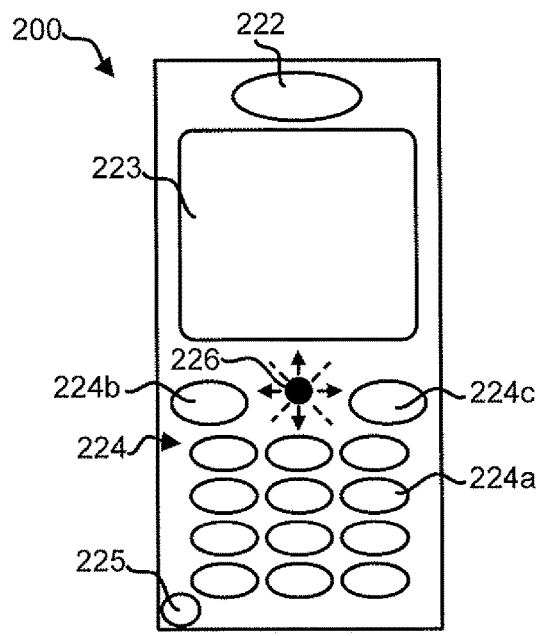
FIG. 2 is a schematic front view illustrating a mobile terminal according to an embodiment.

An embodiment 200 of the mobile terminal 100 is illustrated in more detail in FIG. 2. The mobile terminal 200 comprises a speaker or earphone 222, a microphone 225, a display 223 and a set of keys 224 which may include a keypad 224a of common ITU-T type (alpha-numerical keypad representing characters "0"-"9", "*" and "#") and certain other keys such as soft keys 224b, 224c and navigational input device 226 such as a joystick or a joypad.

Figure 3:
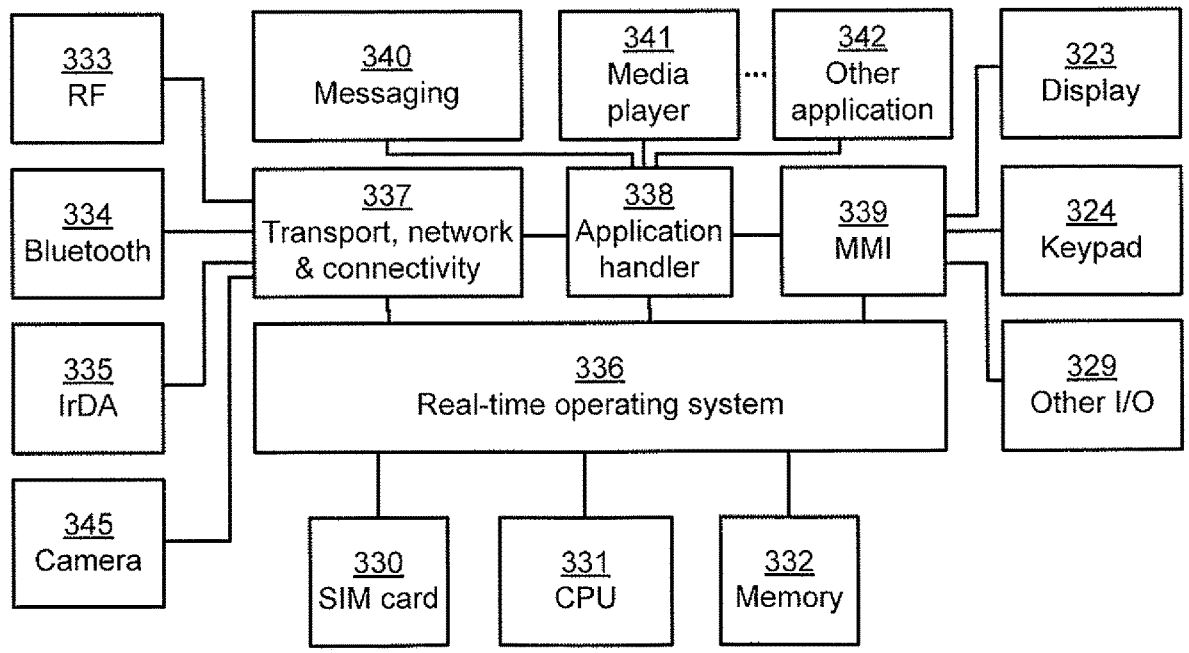
FIG. 3 is a schematic block diagram representing an internal component, software and protocol structure of the mobile terminal shown in FIG. 2.

The internal component, software and protocol structure of the mobile terminal 200 will now be described with reference to FIG. 3. The mobile terminal has a controller 331 which is responsible for the overall operation of the mobile terminal and is preferably implemented by any commercially available CPU ("Central Processing Unit"), DSP ("Digital Signal Processor") or any other electronic programmable logic device. The controller 331 has associated electronic memory 332 such as RAM memory, ROM memory, EEPROM memory, flash memory, hard drive, optical storage or any combination thereof. The memory 332 is used for various purposes by the controller 331, one of them being for storing data and program instructions for various software in the mobile terminal. The software includes a real-time operating system 336, drivers for a man-machine interface (MMI) 339, an application handler 338 as well as various applications. The applications can include a messaging application 340 for short messaging service (SMS), multimedia messaging service (MMS) and electronic mail, a media player application 341, as well as various other applications 342, such as applications for voice calling, video calling, web browsing, document reading and/or document editing, an instant messaging application, a phonebook application, a calendar application, a control panel application, one or more video games, a notepad application, etc.

The MMI 339 also includes one or more hardware controllers, which together with the MMI drivers cooperate with the display 323/223, keypad 324/224, as well as various other I/O devices 329 such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 337 and which provide communication services (such as transport, network and connectivity) for an RF interface 333, and optionally a short-range radio frequency link (e.g. BLUETOOTH®) interface 334 and/or an IrDA interface 335 for local connectivity. Optionally, a camera 345 is provided. The RF interface 333 comprises an internal or external antenna as well as appropriate radio circuitry for establishing and maintaining a wireless link to a base station (e.g., the link 102 and base station 104 in FIG. 1). As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

The mobile terminal also has a SIM card 330 and an associated reader. As is commonly known, the SIM card 330 comprises a processor as well as local work and data memory.

Now follows a more detailed discussion about predictive text dictionaries according to disclosed embodiments. In general, a predictive text dictionary will be more effective if it reflects this varied and dynamic nature of language. The dictionary should gradually adapt to individual users and user groups as their preferences and vocabulary change.

However, if the predictive text system for a mobile terminal relies only on each individual user's input to guide vocabulary changes, then each new word or changing priority can only be recognized when the dictionaries in the mobile terminal fails to predict what the user wants. This failure and correction will be repeated thousands of times across thousands of users, as each user tries to use new popular terms or names in their messages. For example, if a new pop star is named "ZZbug", every user who sends a message about "ZZbug" will have to multitap the word each time, or enter it into his dictionary. Eventually, most users in the group will have "ZZbug" in their dictionaries.

Because users themselves are creating the gradual change in the language, the disclosed embodiments are able to use that information to change the dictionaries for some users based on the behavior of many users (or based on the behavior of a few trend leaders) who have already adapted their own dictionaries. For users who are following the trends (knowingly or unknowingly), the mobile terminal should be ready to recognize "ZZbug" the first time they enter it.

For efficient updating of dictionaries, the disclosed embodiments allow the download of adapted dictionaries from a server to mobile terminals. These adapted dictionaries can in turn be generated by the server from personal dictionaries, uploaded from mobile terminals to the server.

Figure 4:
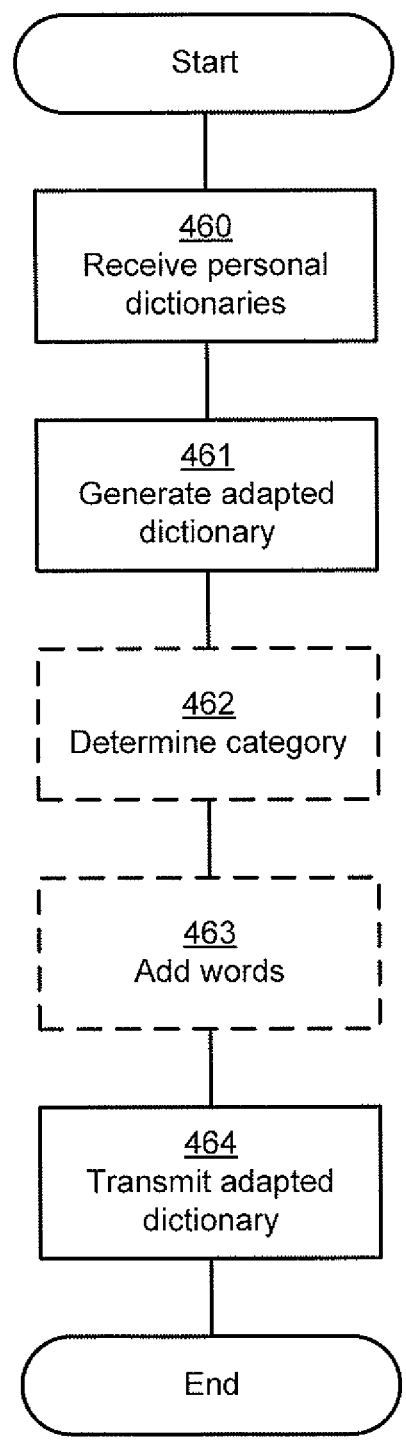
FIG. 4 is a flow chart illustrating a method for dictionary processing according to an embodiment to be executed in a server.

In FIG. 4, it is illustrated a flow chart for processing server based dictionaries in a server, such as server 115 of FIG. 1.

Initially, in a receive personal dictionaries step 460, one or more personal dictionaries are received. Each personal dictionary comes from one mobile terminal. Full personal dictionaries can be received or optionally only updates to the dictionaries are received. In one embodiment, there is no access control on who is allowed to send personal dictionaries to the server. In another embodiment, only authorized users of mobile terminals are allowed to send their personal dictionaries to the server. If authorization is required, authentication data, such as user name and password, can be sent along with the personal dictionary. In one embodiment, the user/mobile terminal must be authorized prior to sending the personal dictionary.

Once the dictionary/dictionaries have been received in the server, an adapted dictionary is generated in a generate adapted dictionary step 461. Here personal dictionaries belonging to one group are combined. Statistical analysis can be used to determine what words from the personal dictionaries are to be included in the adapted dictionary. In one embodiment, a weight is calculated for each word included in the personal dictionaries and only words with a weight above a certain threshold weight are included in the adapted dictionary. During the weight calculation, a higher level of usage of a word results in a larger weight. Optionally, more recently used words result in a larger weight (e.g. using time from usage of word or time since upload). In one embodiment, statistics related to previous communication between users belonging to the group associated with the adapted dictionary, or between contributors and third parties are considered. For example, using a proximity factor to be multiplied as a factor in the weight calculation, a word which is entered by the user can have a proximity factor of 1; a word which is entered by other users in the same group but received by the current user gains a proximity factor of 0.75; a word entered by a person in the group for communication with another person in the group gains a proximity factor of 0.5; and a word entered by a person in the group in communication with a person outside the group gains a proximity factor of 0.25.

In an optional determine category step 462, a category is assigned to the adapted dictionary. The category can be automatically assigned by analyzing the words included in the adapted dictionary. The category can for example be related to a dialect, a sociolect, a topic, a scientific field, a field of art, a sport, or a specific field of interest.

Furthermore, in an optional add words step 463, words can be added, or seeded, in the adapted dictionary. For example, words related to marketing, such a new product available on the market, can be added to the adapted dictionary. When users subsequently download the adapted dictionary, the name of the product will be made available for use during predictive text entry in the mobile terminal. Optionally, words can be added by an assigned administrator of the adapted dictionary. The administrator can for example be an authority in a particular field of interest which is relevant for the group using the adapted dictionary.

Finally in this illustrated process, the adapted dictionary is transmitted to the mobile terminals in a transmit adapted dictionary step 464. As will be explained in more detail below, the adapted dictionary can be "pushed" from the server side or it can be "pulled" from the mobile terminal side. If the amount of available memory available on the mobile terminal is available to the server, the adapted dictionary can optionally be reduced in size to be sufficiently small in size.

Figure 5:
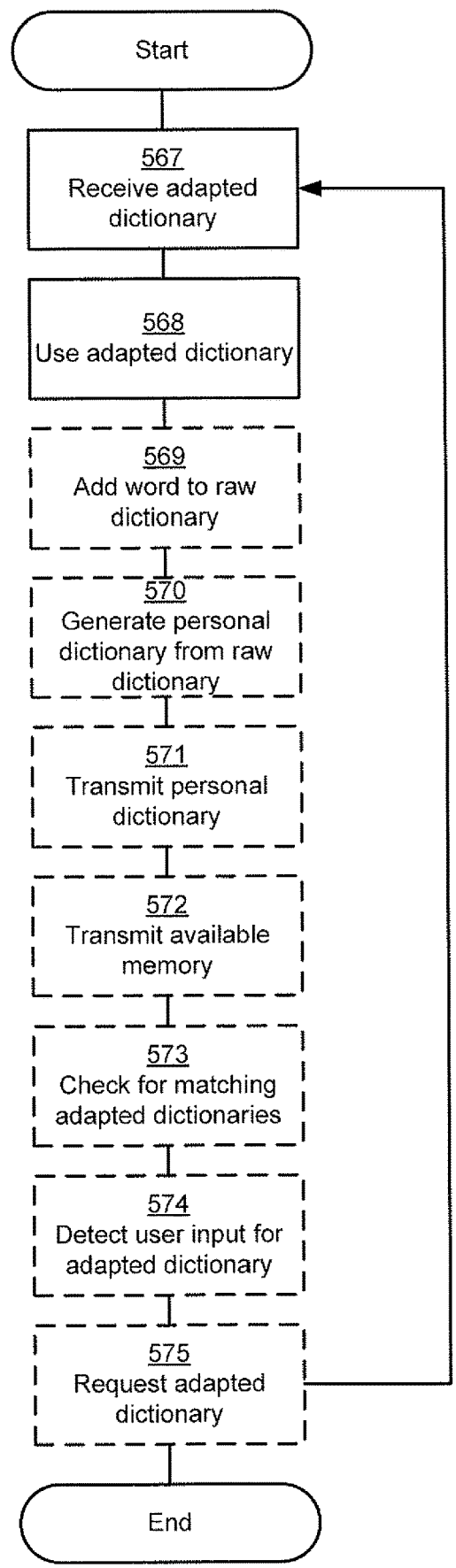
FIG. 5 is a flow chart illustrating a method for dictionary processing according to an to be executed in a mobile terminal.

FIG. 5 is a flow chart illustrating a process for dictionary processing performed in a mobile terminal, such as mobile terminal 100 of FIG. 1. This mobile terminal process is designed to interact with the server process of FIG. 4, although this process could also interact with other server processes.

In the first step in this process, a receive adapted dictionary step 567, the adapted dictionary is received in the mobile terminal from the server. The dictionary can be kept separate from any other dictionaries, e.g. a raw user dictionary. The raw user dictionary is to be construed as the dictionary to which the user adds words not present in the predictive text dictionary supplied with the mobile terminal. Alternatively, the adapted dictionary can be merged with the raw dictionary.

In a use adapted dictionary step 568, the received adapted dictionary is used. Typically, the dictionary is used for predictive text entry, allowing the user to easily enter words available from the adapted dictionary, regardless whether the adapted dictionary has been merged with the raw dictionary or whether it is kept separate. Optionally, every time a word from the raw dictionary or the adapted dictionary is used, usage data is gathered. This may for example include data about times when each word is used, allowing data about frequency and extent of use to be derived.

Optionally, in an add word to raw dictionary step 569, the user can add any word previously not in the raw dictionary nor in the adapted dictionary. The added word is thus available for predictive text entry. Words can be added individually, e.g., during text entry, or several at a time by scanning content items in the mobile terminal containing text. The scan can be performed upon request from the user, or it can be performed according to a schedule, e.g., once a week. In this way, a lot of common words and names that are not present in the basic dictionary supplied with the mobile terminal, are added to the raw dictionary and, in this embodiment, can be shared with other users. The words can for example be found in a mobile terminal's calendar notes, text messages, contact lists (names, addresses, and titles), music playlists, file manager (file names), image and sound titles, and browser bookmarks.

In an optional generate personal dictionary from raw dictionary step 570, the mobile terminal generates the personal dictionary from the raw dictionary. Optionally, the above mentioned usage data is used for statistical evaluation on what words to include. E.g. a usage weight can be determined for each word, where only words having at least a threshold weight is included in the personal dictionary. In one embodiment, all words of the raw dictionary are included in the personal dictionary.

Once there is a generated personal dictionary, in an optional transmit personal dictionary step 571, the personal dictionary is transmitted to the server. In the server process of FIG. 4, this personal dictionary is received in a receive personal dictionaries step 460.

Furthermore, in an optional transmit available memory step 572, the amount of memory available in the mobile terminal for dictionaries is transmitted. This information can be used by the server to reduce the size of any adapted dictionaries transmitted to the mobile terminal.

In an optional check for matching adapted dictionaries step 573, any words added in the add words to raw dictionary step are checked against available adapted dictionaries on the server. The server then checks the words against the adapted dictionaries that are available to the server and if there are matches more than a pre-determined threshold, the server responds to the mobile terminal with references to matched dictionaries.

In an optional detect user input for adapted dictionary step 574, the user is presented with the option to download the matching dictionary found in the check for matching adapted dictionary step 573, and a confirmation to download the adapted dictionary is detected.

In the optional request adapted dictionary step, the adapted dictionary is requested from the server. This is an example of "pull" type dictionary distribution, whereby the mobile terminal requests the download. If this step is performed, the process continues to the receive adapted dictionary step 567 to receive the requested dictionary. If access to an adapted dictionary is restricted, authentication data can also be transmitted from the mobile terminal in this step, e.g. username and password or certificate information previously configured by the user of the mobile terminal.

Figure 6:
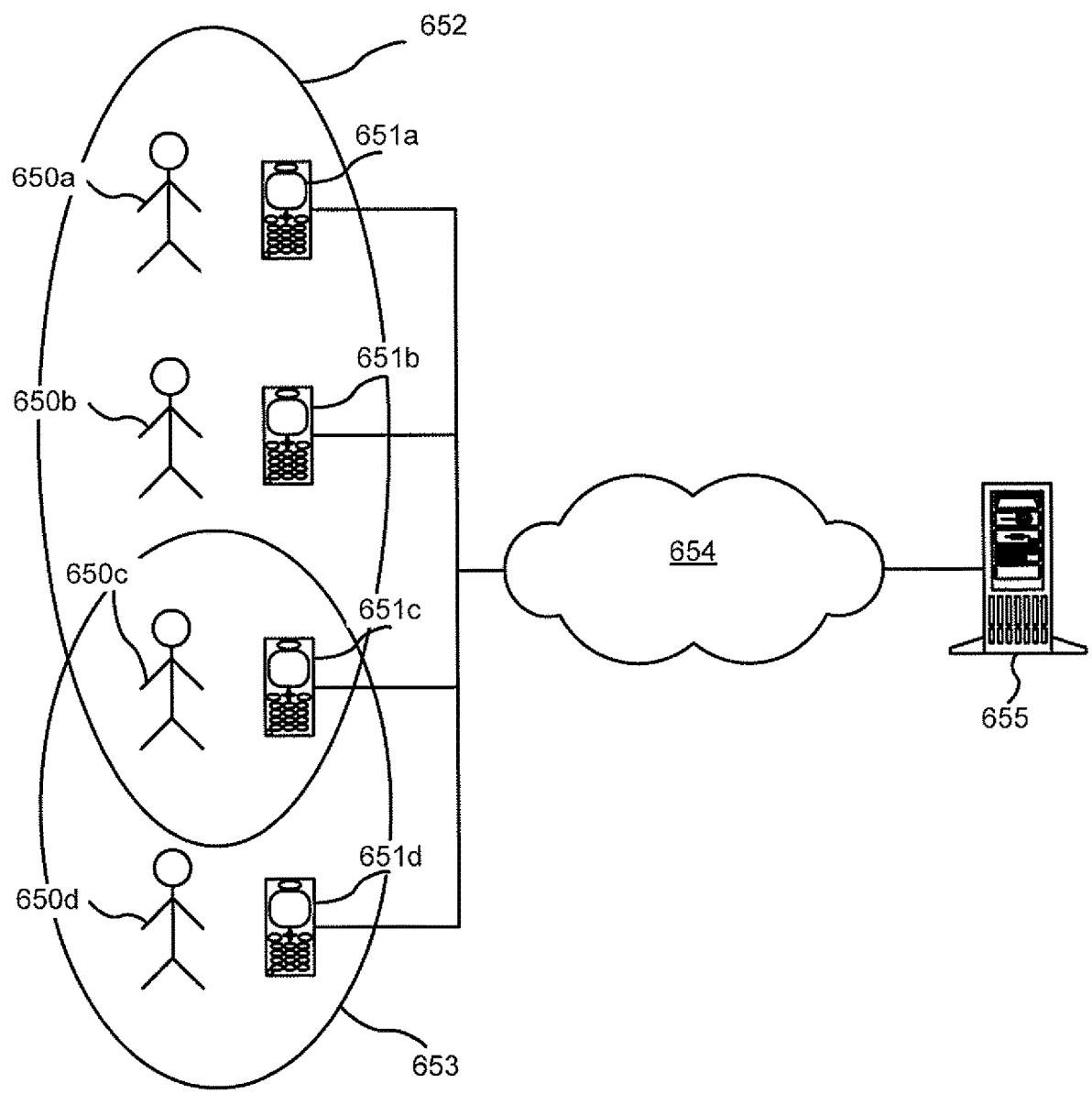
FIG. 6 is a schematic illustration of usage of dictionaries in a system according to an embodiment.

FIG. 6 is a schematic illustration of usage of dictionaries in a system according to disclosed embodiments. In particular, it illustrates the relationship of groups and access rights.

There are four users 650*a-d* of four mobile terminals 651*a-d*, respectively, such as the mobile phone 100 of FIG. 1. Each mobile terminal 651*a-d* is connected to a server 655, such as server 115 of FIG. 1, over a network 654, such as the combination of the mobile telecommunications network 110 and the wide area network 122 of FIG. 1.

Users 650*a-c* all belong to the same group 652. The group can for example be an employer (company), a group of friends, a sports team, a club or any other defined group. Through access control, access to a particular dictionary can be limited only to members of the group 652. The users 650*a-c*, being members of the group, can configure their respective mobile terminals 651*a-c* to allow access to the adapted dictionary for that group 652. This can for example be performed by entering username and password or associating a digital certificate. Access can be restricted for contributing to dictionaries, for downloading dictionaries or to both. Access can be further refined by allowing some users to only download dictionaries, and other users to both contribute to and download dictionaries.

With the group structure described above, a group of friends can define an adapted dictionary for them, whereby when new, trendy words are used more frequently, they are automatically added to the adapted dictionary used by all members of the group. Less time is therefore spent on entering new words into personal dictionaries, seen on the group as a whole or an individual person over time. The building effort for the adapted dictionary can act as a centerpoint of a club or commercial site. In contrast, a public dictionary can be thought of as an automated "wiki-dictionary". Anyone can contribute, but contributions that aren't supported by other users won't become part of the product that most users download, maintained by statistical analysis of usage of words in the dictionary.

Furthermore, any user can be a member of two or more groups. See for example user 650*c* using mobile terminal 651*c*, belonging to both groups 652 and 653.

FIGS. 7*a-d* are sequence diagrams illustrating usage scenarios of the disclosed embodiments. As time passes, events further down in the diagrams are executed. On the left hand side, a client 780 (such as mobile terminal 100 of FIG. 1), is represented and on the right hand side is the server 781, such as server 115 of FIG. 1. Boxes denote processing and arrows between the two sides denote communication.

In a first scenario illustrated in FIG. 7*a*, push distribution of dictionaries is illustrated.

Initially, in an add word to raw dictionary step 782, words are added to the raw dictionary, corresponding to step 569 of FIG. 5. Furthermore, the personal dictionary is generated in a generate personal dictionary step 783, corresponding to step 570 in FIG. 5. The personal dictionary 784 is then transmitted from the client 780 to the server 781. The transmission can occur as a response to user input or it can occur automatically, when a transmit condition is fulfilled. The transmit condition can for example be to transmit on regular intervals, or when any change has occurred in the personal dictionary.

When the server has received one or more personal dictionaries 784, it can generate an adapted dictionary in the generate adapted dictionary step 785, corresponding to step 461 in FIG. 4.

Since this is a scenario for push distribution, the server then initiates a communication for communication of the adapted dictionary 786. Recipients for the dictionaries can be all recipients belonging to a group, such as mobile terminals 651*a-c* belonging to group 652. The communication of the adapted dictionary 786 can be performed upon generation of the adapted dictionary 785, or at set intervals, e.g. once a day, once a week, etc.

Once the client 780 has received the adapted dictionary, the client 780 can use the received adapted dictionary, illustrated by the use adapted dictionary step 787, corresponding to step 568 in FIG. 5.

The scenario illustrated in FIG. 7*b* is similar to the scenario in FIG. 7*a*, with the difference that here the distribution of the adapted dictionary is performed on a pull basis. This is illustrated by that after the generation of the adapted dictionary 785 is performed in the server 781, the client 780 transmits a request for adapted dictionary 788. Only after this request 788 does the server 781 transmit the adapted dictionary 786 to the client 780.

Figure 7C:
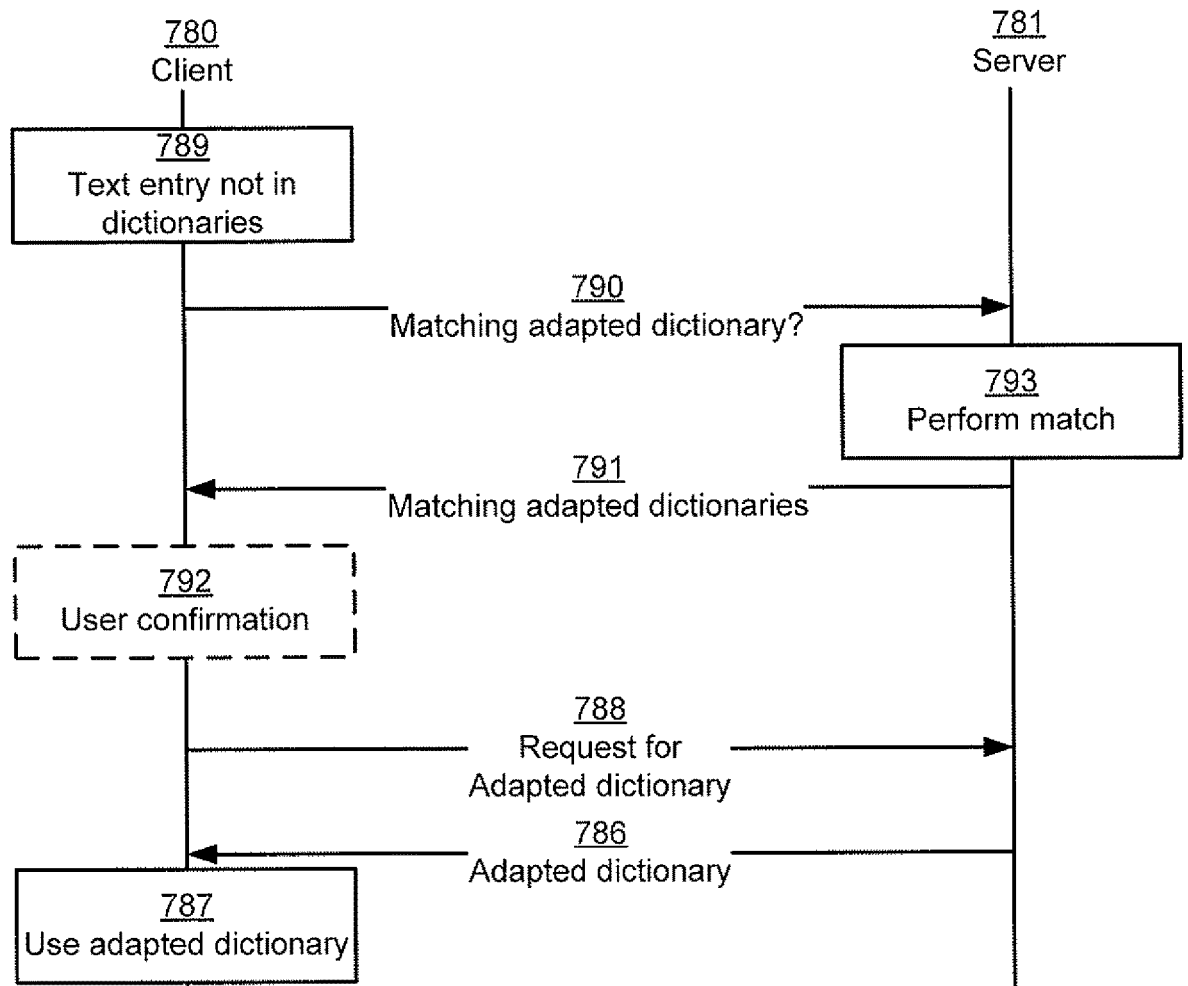

FIG. 7*c* illustrates a scenario where new words are matched against adapted dictionaries.

When, in the client 780, it is noticed that a user text entry is not in any of the available dictionaries 789, a request 790 for matching adapted dictionaries is transmitted to the server 781 from the client 780. This request 790 contains one or more words. The server 781 then performs a match 793 of the words received in the request 790 from the client, and responds with a matching adapted dictionaries response 791. This response contains references and optionally titles for any matching dictionaries. In other words, there can be no matches, one match, or several matches.

The client then optionally receives user confirmation 792 for what dictionary to download. Especially when there are several matching dictionaries, it is useful for the user of the client 780 to be able to select which, if any, dictionaries to download.

The remaining steps correspond to the like numbered steps in FIG. 7*b*.

Figure 7D:
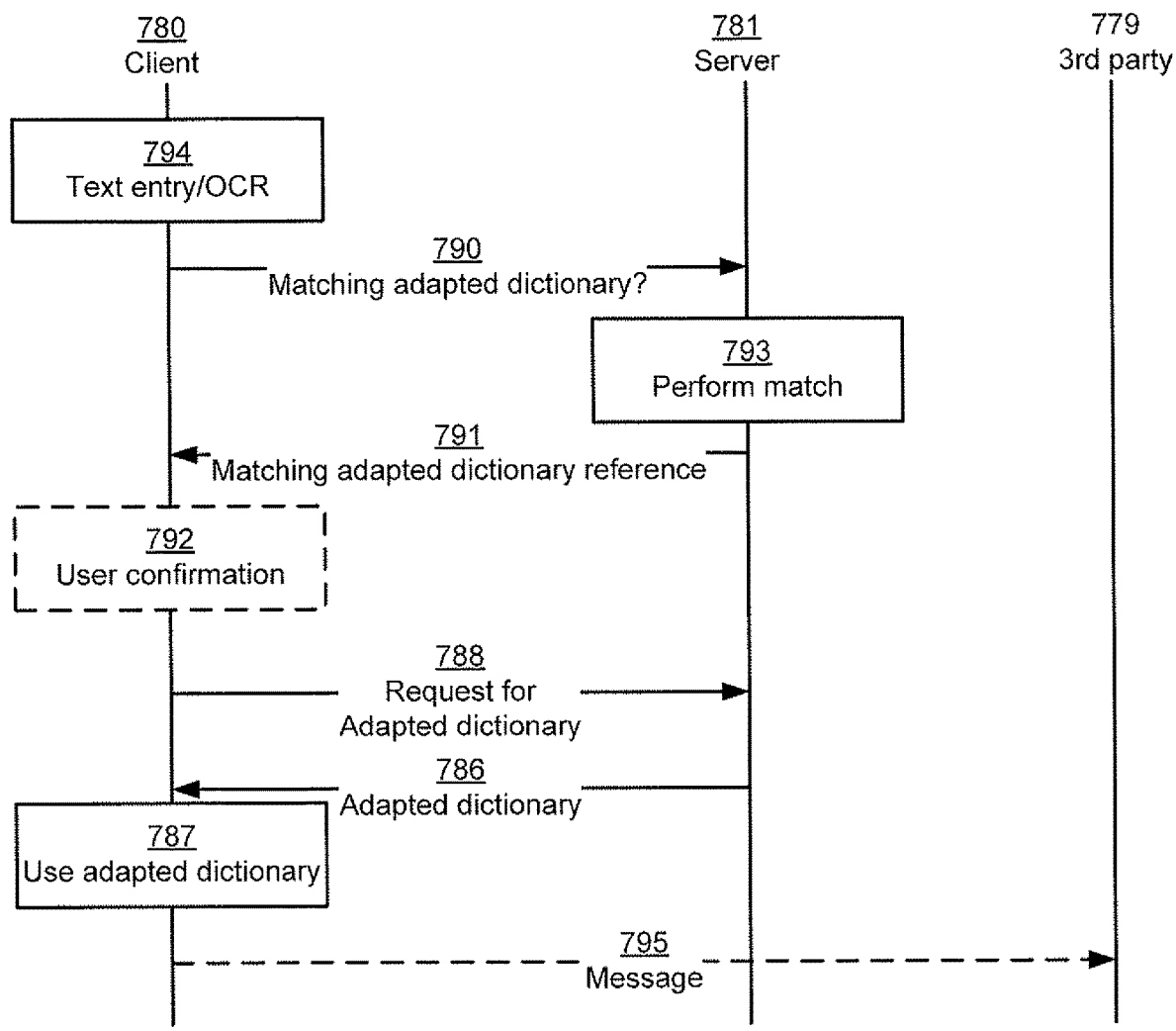

FIG. 7*d* illustrates the use of server stored dictionaries for looking up new words. Apart from the client 780 and the server 781 already mentioned, there is also a third party 779, such as mobile terminal 106 of FIG. 1.

Initially the user of the client 780 obtains a text to look up in a dictionary in a text entry/OCR step 794. As suggested, either direct text entry or optical character recognition (OCR), e.g. of a picture obtained with the camera 345, can be used to obtain the text to look up. The processing up to the use of the adapted dictionary 787 corresponds to elements of like numbers of FIG. 7*c*. In the use adapted dictionary step 787, the user can additionally use the received adapted dictionary to understand the requested word. In other words, the adapted dictionary used here can also contain explanations for each word, and optionally illustrating pictures. Optionally, when the user of the client 780 sends a message 795 to the third party 779, a reference to the adapted dictionary on the server 781 (or the actual adapted dictionary itself) can be included. Thereby the third party can have easy access to the explanations provided in the adapted dictionary.

Here follows an illustrative example for this embodiment: John Doe is out buying paint. He does not understand all the technical terms nor the names so he takes a picture of some words he does not understand and sends them to the server to get explanations. A dictionary is downloaded which explains the terms (possibly with pictures). His wife also receives a copy of the dictionary. John thinks that one paint is particularly nice and asks his wife in a text message if she agrees. As he types in the strange color name and the technical name of the type of paint, his predictive input dictionary already has those words so they are easy to input. As his wife receives the message she does not understand the terms but can easily look them up (possibly through marking them or they are already highlighted and selecting look up). She thinks that the color is wrong and asks him for another color with a strange name that she knows. Normally this color is not in the dictionary but after the recent download it is. The whole process of understanding difficult terms and color names has thus been simplified and husband and wife could easily understand each other.

It is to be noted that the adapted dictionary in this scenario can be a dictionary adapted to each particular case.

In another scenario, there is an adapted dictionary with a regularly added new word. For example, there could be a technology dictionary with a new word added each day, with an explanation of the word and optionally a picture. Such an adapted dictionary could be maintained by a magazine or newspaper for marketing purposes. Similarly, there can be an acronym dictionary, where acronyms are explained with full meaning, and potential explanations.

Figure 8:
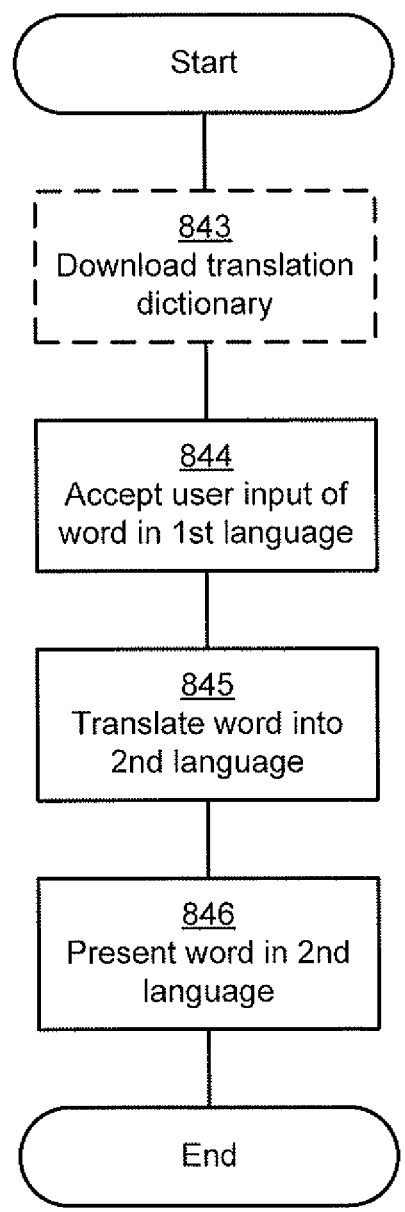
FIG. 8 is a flow chart of a method for translation according to an embodiment.

FIG. 8 is a flow chart of a method for translation according to the disclosed embodiments. In this embodiment, the method is executed in a mobile terminal, such as mobile terminal 100 of FIG. 1.

In an initial optional download translation dictionary step 843, a translation dictionary is downloaded from a server, such as server 115 of FIG. 1. This step is optional; the translation dictionary can be present in the mobile terminal from production.

Text input is accepted in a step 844 to accept user input of word in first language. Here, the text input of the first language is accepted in an application whose main purpose is something other than translation. For example, it could concern text input in a messaging application, for an appointment in a calendar application, for a note in a notes application, etc. Consequently, making translations of individual words is an integral part of text input, so the user does not have to use several applications.

The actual translation occurs in a translate word into second language step 845. A look-up is performed in the translation dictionary to find an equivalent word in the second language of the accepted word in the first language.

In the present word in second language step 846, the equivalent word in the second language is presented to the user, typically on the display of the mobile terminal 100. Alternatively, the word in the second language is output audibly using speech synthesis.

It is to be noted that aspects of the disclosed embodiments can also be used to back up a personal dictionary onto a server, for later download to another mobile terminal. For example, a user of a mobile terminal can upload the personal dictionary to the server, and then download the personal dictionary to a new mobile terminal. This can be particularly useful when a user switches mobile phones.

Although the invention has above been described using an embodiment in a mobile terminal, the invention is applicable to any type of portable apparatus, including portable mp3-players, cameras, pocket computers, portable gaming devices, etc.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method comprising:
   receiving one or more user-provided words from a personal dictionary of a first apparatus, the user-provided words having been added to at least one personal predictive text dictionary by a user;
   including at least one of the user-provided words in an adapted dictionary; and
   in response to a request to transmit a user-initiated message including the one or more user-provided words from the first apparatus to a second apparatus, enabling transmission of the adapted dictionary to the second apparatus for use by the second apparatus.

2. The method according to claim 1, wherein said at least one personal dictionary comprises a plurality of personal dictionaries.

3. The method according to claim 1, wherein:
   said receiving comprises receiving at least part of a plurality of personal dictionaries, each of said plurality of personal dictionaries being associated with a user being associated with one group of users; and
   said adapted dictionary comprises words of said at least part of said plurality of personal dictionaries.

4. The method according to claim 1, wherein statistical analysis is used to determine what words of said words of said at least part of at least one personal dictionary, are to be included in said adapted dictionary.

5. The method according to claim 1, wherein the method comprises:
   calculating a weight for each of said words of at least part of at least one personal dictionary; and
   including in the adapted dictionary only words of said words of at least part of at least one personal dictionary, with a weight greater than a threshold weight.

6. The method according to claim 5, wherein said calculating a weight for each of said words includes calculating a weight using a time stamp associated with each word as a parameter.

7. The method according to claim 1, further comprising: determining a category for said adapted dictionary.

8. The method according to claim 7, wherein said determining a category for said adapted dictionary comprises determining a category related to an aspect selected from the group consisting of: a dialect, a sociolect, a topic, a scientific field, a field of art, sport, and a specific field of interest.

9. The method according to claim 1, further comprising, prior to said transmission:
   adding at least one word to said adapted dictionary, said at least one word being related to marketing of a product or a service.

10. The method according to claim 1, wherein said receiving comprises:
    accepting only personal dictionaries associated with users being authorized to contribute to said adapted dictionary.

11. The method according to claim 1, wherein said transmission comprises transmitting at least part of said adapted dictionary only to apparatuses corresponding to authorized recipients of said adapted dictionary.

12. The method according to claim 1, wherein said transmission comprises:
    transmitting at least part of said adapted dictionary to apparatuses with users associated with said adapted dictionary.

13. The method according to claim 12, wherein said transmission occurs as a consequence of changes occurring in said adapted dictionary.

14. The method according to claim 12, wherein said transmission occurs with regular intervals.

15. A method according to claim 1, further comprising:
    receiving at least part of the adapted dictionary from a server; and
    utilizing said at least part of an adapted dictionary when predictive text entry is performed.

16. The method according to claim 15, further comprising:
    enabling transmission of at least part of at least one personal dictionary to said server.

17. The method according to claim 16, further comprising:
    adding at least one word to a raw dictionary; and
    prior to said transmission, generating each of said at least one personal dictionary from a raw user dictionary.

18. The method according to claim 17, wherein said adding at least one word is performed as a consequence of a source of said at least one word becomes available.

19. The method according to claim 17, wherein said adding at least one word is performed in association with a scan of content items.

20. The method according to claim 17, wherein said including comprises including only words of said raw dictionary with a weight greater than a threshold.

21. The method according to claim 16, wherein said transmission of at least part of at least one personal dictionary to said server is performed as a response to a user input.

22. The method according to claim 16, wherein said transmission of at least part of at least one personal dictionary to said server is performed when a transmit condition is fulfilled.

23. The method according to claim 16, further comprising:
    prior to the enabling transmission of the adapted dictionary to the second apparatus for use by the second apparatus, and further in response to the request to transmit the user-initiated message including the one or more user-provided words from the first apparatus to the second apparatus, (a) causing transmission of information regarding an amount of memory available in the second apparatus from the second apparatus to the first apparatus, and (b) causing a change in size of the adapted dictionary.

24. The method according to claim 16, wherein said transmission comprises transmitting authentication data.

25. The method according to claim 16, wherein said transmission occurs prior to said receiving.

26. The method according to claim 15, further comprising, prior to said receiving:
transmitting a request to receive at least part of said adapted dictionary.

27. The method according to claim 26, wherein said transmission involves transmitting authentication data.

28. The method according to claim 26, further comprising, prior to said transmitting a request:
detecting a user input to receive at least part of an adapted dictionary.

29. The method according to claim 26, further comprising, prior to said transmitting a request:
receiving text input;
checking whether at least one word of said text input is absent from a raw dictionary;
when it is determined that at least one word is absent from said raw dictionary, said
at least one word is determined to be present in a matching adapted dictionary.

30. The method according to claim 29, further comprising:
comparing said at least one word being absent from said raw dictionary with an adapted dictionary, resulting in zero or more matches,
when there are at least a threshold number of matches, prompting a user of said apparatus whether to download said adapted dictionary, and
in response to a user indication to download said adapted dictionary, causing said adapted dictionary to be downloaded.

31. An apparatus comprising at least one processor and at least one memory including computer program code, the at least one memory and the computer program code configured to, with the at least one processor, direct the apparatus at least to:
receive one or more user-provided words from a personal dictionary of a first apparatus, the user-provided words having been added to at least one personal predictive text dictionary by a user;
include at least one of the user-provided words in an adapted dictionary; and
in response to a request to transmit a user-initiated message including the one or more user-provided words from the first apparatus to a second apparatus, enabling transmission of the adapted dictionary to the second apparatus for use by the second apparatus.

32. The apparatus of claim 31, wherein the apparatus is a server.

33. A computer program product comprising a non-transitory medium having software instructions that, when executed in a server, performs the method according to claim 1.

34. A computer program product comprising a non-transitory medium having software instructions that, when executed in a mobile communication terminal, performs the method according to claim 15.

35. A computer program product comprising a non-transitory medium having software instructions that, when executed in a mobile communication terminal, performs the method according to claim 1.

36. A method comprising:
receiving an adapted dictionary at a second apparatus, the adapted dictionary including at least one user-provided word, the user-provided words having been added to at least one personal predictive text dictionary of a first apparatus by a user, wherein the adapted dictionary is transmitted to the second apparatus from the first apparatus in response to a request to transmit a user-initiated message including the at least one user-provided word from the first apparatus to the second apparatus; and
using the received adapted dictionary by the second apparatus during predictive text entry using the second apparatus.

37. The method of claim 36, wherein said adapted dictionary comprising one or more matching words further comprises one or more related words relating to the one or more matching words.

38. An apparatus comprising:
at least one processor, and
at least one memory including computer program code,
the at least one memory and the computer program code configured to, with the at least one processor, cause the apparatus to perform the following:
in response to a request to transmit a user-initiated message including at least one user-provided word from a first apparatus to a second apparatus, receiving an adapted dictionary at the second apparatus, the adapted dictionary including the at least one user-provided word, the user-provided words having been added to at least one personal predictive text dictionary of first apparatus by a user; and
providing for using the received adapted dictionary during predictive text entry, using the second apparatus.

39. Apparatus according to claim 38, wherein the apparatus is the second apparatus or a part of the second apparatus.

40. The first apparatus according to claim 39, wherein said second apparatus is comprised in an apparatus selected from the group consisting of a mobile communication terminal, a portable mp3-player, a camera, a pocket computer, and a portable gaming device.

* * * * *